United States Patent [19]

Pringle et al.

[11] 4,068,679
[45] Jan. 17, 1978

[54] TOWER DRIVE MECHANISM FOR SELF-PROPELLED SPRINKLER SYSTEM

[75] Inventors: Ray T. Pringle; Kenneth R. Ames, both of Walla Walla, Wash.

[73] Assignee: Frontier Machinery, Inc., Walla Walla, Wash.

[21] Appl. No.: 686,467

[22] Filed: May 14, 1976

[51] Int. Cl.² ............................................. B05B 3/12
[52] U.S. Cl. .................................. 137/344; 239/177; 239/212
[58] Field of Search ................ 137/344; 239/177, 212, 239/213

[56] References Cited
U.S. PATENT DOCUMENTS

| | | | |
|---|---|---|---|
| 3,653,400 | 4/1972 | Coates | 137/344 |
| 3,771,719 | 11/1973 | Raso et al. | 137/344 |

Primary Examiner—Alan Cohan
Assistant Examiner—Gerald A. Michalsky
Attorney, Agent, or Firm—Wells, St. John & Roberts

[57] ABSTRACT

A tower drive mechanism is described for a self-propelled sprinkler system having a water conduit elevationally supported by spaced towers. Each tower has a frame with leg members extending downward and outward interconnecting with a cross axle tube. Tandem wheel assemblies are mounted on the frame adjacent respective ends of the axle tube. A single electric motor is connected to one of the wheel assemblies. An interconnecting drive shaft extends through the axle tube interconnecting the wheel assemblies so that the drive shaft does not become entangled with field debris or vegetation. The wheel assemblies and the motor have their individual worm gear reduction boxes.

8 Claims, 6 Drawing Figures

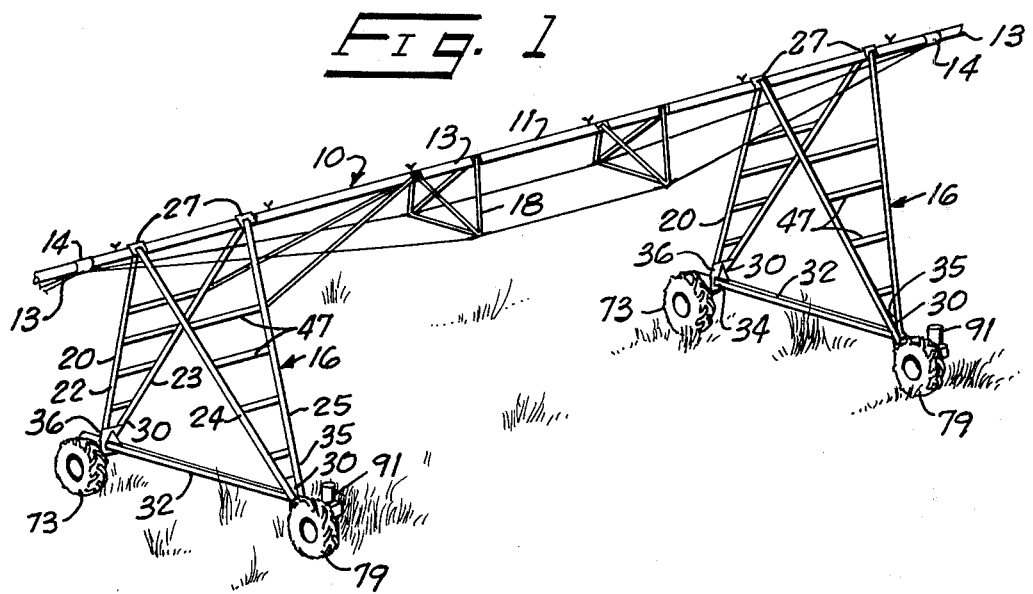
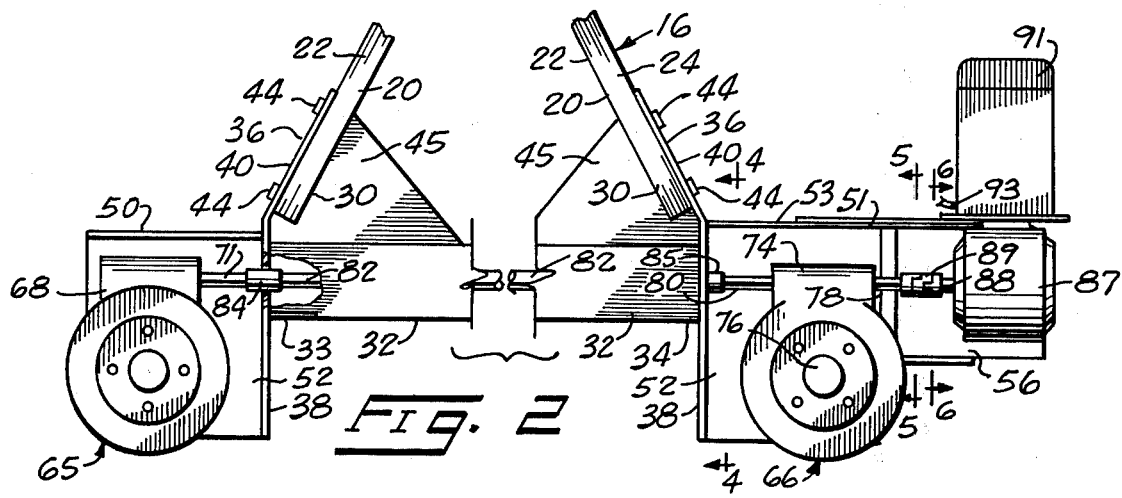
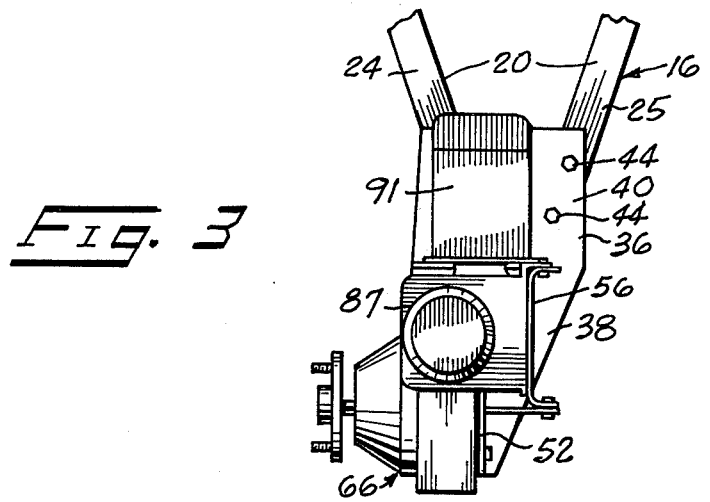

TOWER DRIVE MECHANISM FOR SELF-PROPELLED SPRINKLER SYSTEM

BACKGROUND OF THE INVENTION

This invention relates to self-propelled sprinkler systems and more particularly to drive systems for moving sprinkler systems over a field.

Considerable effort has been expended by the self-propelled sprinkler system manufacturers to develop reliable drive subsystems for propelling a srinkler system over a field. The sprinkler system operates in a very adverse environment that includes a great deal of moisture, soft ground, and high vegetation. Additionally, the industry is extremely competitive requiring that any reliable drive subsystem additionally be quite economical.

Most circular irrigation equipment systems include a plurality of spaced towers along the water conduit for supporting and propelling the conduit across the field. Generally the tower is supported by two tandem wheels that are spaced on opposite sides of the center line of the water conduit. Some manufacturers have developed individual electric drive motor systems for each tandem wheel. An example of such a system is illustrated in the Bryant et al U.S. Pat. No. 3,662,776 granted May 16, 1972. Other manufacturers in an effort to economize and reduce the number of electric motors required to drive the system have utilized a single electrical motor placed intermediate the tandem wheels with dual drive shafts extending from the electrical motor gearbox outward in both directions to the wheel assemblies. Examples of such concepts are illustrated in the Fry U.S. Pat. No. 3,831,682 granted Aug. 27, 1974; the Reinke U.S. Pat. No. 3,623,662 granted Nov. 30, 1971 and the Zimmerer et al U.S. Pat. No. 3,730,435 granted May 1, 1973. One of the major problems associated with such systems is that the drive shaft frequently becomes entangled with the vegetation. After a while the entangled vegetation is capable of stopping the movement of the drive shafts which completely stops the entire system.

A further development in this regard is illustrated in the Raso et al U.S. Pat. No. 3,771,719 granted Nov. 13, 1973. The Raso patent describes a drive system having a single motor adjacent one of the wheels with a drive shaft extending from one wheel to the other tandem wheel to drive the wheel in unison from a single drive motor. Likewise such a system enables the vegetation to become entangled with the interconnecting drive shaft.

One of the principal objects of this invention is to provide a sprinkler system that is quite economical using a single drive motor per tower while at the same time being able to prevent the high vegetation from becoming entangled in the drive system and rendering it inoperative.

An additional object of this invention is to provide an improved tower drive subsystem for a sprinkler system utilizing a single drive motor per tower in which the connecting drive shafts are connected to respective gear reduction units without utilizing universal joints.

An additional object of this invention is to provide an improved tower drive system utilizing a single electric motor per tower in which the drive system may be accurately aligned to eliminate the need for misalignment compensating mechanisms such as universal joints.

A further object of this invention is to provide a tower drive system that utilizes a single drive motor per tower that is considerably more reliable and capable of more extended life than previous systems.

A further object of this invention is to provide an improved tower drive system utilizing a single drive motor per tower that is capable of smoothly starting and stopping without the conventional jerks generally associated with constant speed electrical drives.

A still further object of this invention is the safety afforded to operating personnel by preventing inadvertant contact with moving parts, as specified in regulations proposed by OSHA for farm field equipment.

These and other objects and advantages will become apparent upon reading the following detailed description of a preferred embodiment.

BRIEF DESCRIPTION OF THE DRAWINGS

A preferred embodiment of this invention is illustrated in the accompanying drawings, in which:

FIG. 1 is a perspective view of a segment of a self-propelled sprinkler system having a water conduit that is supported by spaced towers having individual drive subsystems which incorporate the principal feature of this invention;

FIG. 2 is a fragmentary side view of a tower particularly emphasizing the tower drive system;

FIG. 3 is a fragmentary end view of a tower;

DETAILED DESCRIPTION OF A PREFERRED EMBODIMENT

Figure 4:
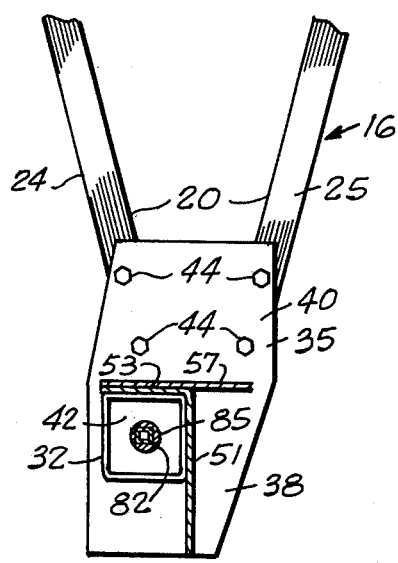
FIG. 4 is a vertical cross sectional view taken along line 4—4 in FIG. 2.

Referring now in detail to the drawings, there is illustrated in FIG. 1 a portion of a self-propelled sprinkler system generally designated with the numeral 10. The sprinkler system 10 includes an elevated water conduit 11 that is transported over a field with sprinklers mounted thereon for spraying water onto a field for irrigation or like purposes. The conduit 11 is formed of a plurality of pipe sections 13 in which the pipe sections are flexibly connected to each other through flexible joints 14. The conduit 11 is supported by a plurality of longitudinally spaced mobile towers 16 for transporting the conduit transversly over a field. The mobile towers 16 are generally oriented transverse to the center line of the conduit 11 for transporting the conduit laterally across the field. Generally the pipe sections are supported intermediate the towers through truss structures 18.

Each mobile tower 16 includes a frame 20 having leg members that are connected to the conduit and extend downwardly and outwardly from the center line to wheel assemblies. In the embodiment illustrated in the drawings, the frame 20 includes two pairs of leg members 22–23 and 24–25 that have upper ends 26 connected to brackets 27 that are affixed to the conduit. The leg members 22–25 extend downwardly and laterally outward from the conduit 11, terminating in lower ends 30. The lower ends 30 are connected to ends 33, 34 of horizontal axle tube 32 that extends transverse to the center line of the conduit.

The frame 20 includes leg plates 35 and 36 that are affixed to the ends 33 and 34 respectively for connecting the axle 32 to leg members 22-25. Each leg plate 35, 36 includes a vertical section 38 that extends directly over the ends 33, 34 and an inclined section 40 that extends upward and inward toward the center line for connecting directly to the lower ends 30. Each of the leg plates, 35, 36 has an aperture 42 therein to provide access to the interior of the axle tube 32. It is preferable that the apertures 42 be coaxial with respect to the axis or center line of the tube 32. The tube 32 may be circular or rectangular in cross section. The lower ends 30 of the leg members 22-25 are connected to the inclined sections 40 by bolts 44 or similar means. The frame 20 further includes gusset plates 45 that are rigidly affixed between the tube ends 33, 34 and the inclined sections 40 to provide the desired frame rigidity. The frame 20 further includes horizontal cross members 47 (FIG. 3) that extend between the leg member pairs.

Figure 5:
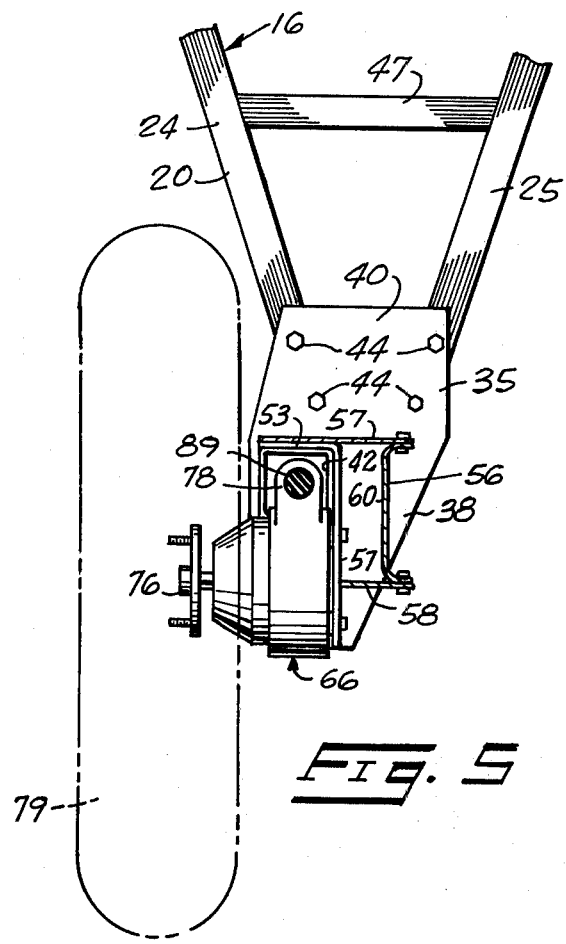
FIG. 5 is a vertical cross sectional view taken along line 5—5 in FIG. 2.
Figure 6:
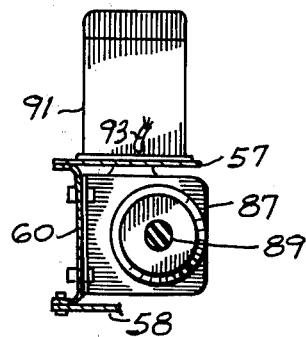
FIG. 6 is a vertical cross sectional view taken along line 6—6 in FIG. 2.

The frame 20 further includes wheel gear box brackets 50 and 51 that are affixed to the leg plates 35 and 36 respectively. The brackets 50 and 51 extend outboard of the respective tube ends 33, 34. Each bracket 50 and 51 includes a vertical side portion 52 that is laterally offset from the aperture 42 and from the center line of the tube. The vertical side portion 52 extends upward along the aperture 42. Each bracket 50 and 51 includes a horizontal top portion 53 that extends vertically over the aperture 42 as illustrated in FIG. 5 to form a partial enclosure.

The frame 20 further includes a motor bracket 56 (FIG. 5) that is rigidly connected to wheel gear box bracket 51. The bracket 56 includes an upper plate 57 that extends horizontally outward, outboard with respect to the bracket 51. The bracket 56 includes a lower plate 58 that is affixed to bracket 51 and extends horizontally outward, outboard of bracket 51 below plate 57. The two plates 57 and 58 are interconnected through a vertical plate 60.

Each mobile tower 16 includes wheel assemblies 65 and 66 that are mounted to respective brackets 50 and 51. The wheel assembly 65 includes a wheel worm gear reduction box 68 that is affixed to the bracket 50 adjacent tube end 33. The wheel worm gear reduction box 68 includes a horizontal wheel axle shaft for supporting wheel 73. Additionally the box 68 includes a worm gear input stub shaft 71 that extends horizontally outward toward the wheel assembly 66.

The wheel assembly 66 includes a wheel worm gear reduction box 74 having a wheel axle shaft 76 that extends horizontally outward receiving wheel 79. The box 74 further includes a worm gear input stub shaft 78 that extends horizontally outward toward the motor bracket 56. The reduction gear box 74 includes a worm gear output stub shaft 80 that extends horizontally outward toward the wheel assembly 65. Stub shafts 71, 78, and 80 are axially aligned with each other on an axis extending through the interior of the tube 32. Preferably the alignment axis of the stub shafts coincides with the axis of the tube 32.

The stub shaft 71 of wheel assembly 64 is directly interconnected to the output stub shaft 80 of wheel assembly 66 by an interconnecting drive shaft 82 that extends through the interior of the tube 32. The interconnecting drive shaft 82 is preferably connected to the stub shafts 71 and 80 by rigid couplings 84 and 85. One of the advantages of this system is that the gear reduction box 68 and 74 may be mounted to their respective brackets 50 and 51 at the manufacturing plant so the stub shafts 71 and 80 are accurately aligned without the need for universal joints. The motor may be installed in the field. Additionally it should be noted that since the drive shaft 82 extends through the interior of the tube 32 that the drive shaft does not become entangled with the high vegetation generally encountered in the use of such sprinkler system. Likewise the drive shaft and accompanying stub shafts are substantially protected from the wet environment. Additionally, operating personnel are protected from the drive shaft.

Additionally each mobile tower 16 includes a single motor gear reduction unit 87 that is affixed to the motor bracket 56. The motor gear reduction unit 87 includes an output stub shaft 88 that is aligned with the input stub shaft 78 of the wheel worm gear reduction box 74. The stub shafts 78 and 88 are connected through a flexible coupling 89 so that a more gradual start-up and stopping will occur without the traditional jerking that is conventional with constant speed electrical drive systems. The mobile tower includes a single electrical motor 91 that is mounted upright with a shaft connected to the motor gear reduction unit 87. An electrical cable 93 extends to the electrical motor 91 from an alignment system, that is not illustrated, for controlling the operation of the motor to maintain general alignment between the interconnected pipe sections 13.

The applicant's system overcomes many of the disadvantages of the drive systems of previous units by providing a drive system utilizing a single electric motor for each tower with the drive system, particularly interconnecting drive shaft 82, protected from the vegetation and other harmful environmental aspects that occur during the normal operation of the system. Personnel protection is also important. Additionally, this system is capable of being more accurately assembled at the manufacturing plant to eliminate the need for shaft misalignment hardware such as universal joints. Previously a drive system required a substantial amount of assembling in the field without the capability of providing accurate fixtures for aligning shafts. The applicant's system enables the equipment to be designed with a longer life with less maintenance at a price that is competitive and compatible with the price structure of the industry. In essence, the applicant is able to provide a significantly improved tower drive subsystem without substantially increasing the cost of the product.

It should be understood that the above described embodiment is simply illustrative of the principles of this invention and that numerous other embodiments may be readily devised by those skilled in the art without deviating therefrom. Therefore, only the following claims are intended to define or limit the applicant's invention.

What is claimed is:

1. In a self-propelled sprinkler irrigation system having an elongated water supply conduit elevationally supported by at least two spaced upright mobile tower assemblies, each of said tower assemblies comprising:
   an upright frame operatively connected to the conduit and extending transverse to the longitudinal axis of the conduit;
   said frame having leg members that extend downward and laterally outward from the conduit;
   said frame having a hollow axle tube extending horizontally between the legs transverse to the water supply conduit;
   wheel assemblies mounted on the frame adjacent ends of the axle tube for movably supporting the frame;

an electric motor mounted to the frame adjacent one end of the axle tube and operatively connected to one of the wheel assemblies for driving the one wheel assembly; and interconnecting drive shaft extending axially through the interior of the hollow axle tube interconnecting the wheel assemblies to cause the wheel assemblies to be driven in unison with the tube protecting the interconnecting drive shaft from environment elements such as water and preventing the interconnecting drive shaft from becoming entangled with field debris or vegetational growth or engaging operating personnel.

2. In the self-propelled sprinkler irrigation system defined in claim 1 wherein each wheel assembly includes a wheel worm gear box in which one gear box has an input worm shaft and the second gear box has an input worm shaft and an axially aligned output worm shaft and wherein the interconnecting drive shaft is axially aligned with and interconnects the output worm shaft of the second gear box and the input worm shaft of the first gear box.

3. In the self-propelled sprinkler irrigation system as defined in claim 2 further comprising a motor gear box directly connected to the motor and having an output shaft connected to the input shaft of the second wheel gear box outboard of the second wheel gear box.

4. In the self-propelled sprinkler irrigation system as defined in claim 3 further comprising a flexible coupling directly interconnecting the output shaft of the motor gear box and the input shaft of the second wheel gear box.

5. In the self-propelled sprinkler irrigation system as defined in claim 1 wherein the frame further includes a leg support plate affixed over each end of the axle tube, said leg support plates having apertures formed therein to enable the interconnecting drive shaft to extend therethrough; said leg support plates being rigidly connected to the legs to rigidly interconnect the leg members to the axle tube.

6. In the self-propelled sprinkler irrigation system as defined in claim 5 wherein the frame further includes a wheel gear reduction box mounting bracket affixed to each leg support plate laterally offset from the plate aperture and extending axially outward from the axle tube to mountably receive one wheel assembly, with the wheel assembly having a worm shaft axially aligned with the interconnecting drive shaft.

7. In the self-propelled sprinkler irrigation system as defined in claim 6 wherein the wheel gear reduction box brackets each have a first portion that extends vertically for mountably receiving the wheel gear reduction box and a second portion which extends substantially horizontally over the wheel gear reduction box to protect the wheel gear reduction box.

8. In the self-propelled sprinkler irrigation system defined in claim 6 wherein the frame further includes a motor gear reduction box bracket affixed to one of the wheel gear reduction brackets and extending outward, outboard from the wheel gear reduction bracket for receiving and supporting the motor gear reduction box outboard of the wheel gear reduction box.

* * * * *